United States Patent
Schwinn

(10) Patent No.: US 8,082,422 B2
(45) Date of Patent: Dec. 20, 2011

(54) PIPELINED PROCESSING

(75) Inventor: Stephen J. Schwinn, Lakeville, MN (US)

(73) Assignee: International Business Machines Corporation, Armonk, NY (US)

( * ) Notice: Subject to any disclaimer, the term of this patent is extended or adjusted under 35 U.S.C. 154(b) by 1861 days.

(21) Appl. No.: 10/932,730

(22) Filed: Sep. 2, 2004

(65) Prior Publication Data

US 2006/0095737 A1 May 4, 2006

(51) Int. Cl.
G06F 15/00 (2006.01)

(52) U.S. Cl. ........................................ 712/218

(58) Field of Classification Search ............... 712/218
See application file for complete search history.

(56) References Cited

OTHER PUBLICATIONS

John L. Hennessy, David A. Patterson; Computer Organization and Design; 1998; Second Edition; pp. 118, 368, 496-497, 500.*

* cited by examiner

Primary Examiner — Eddie P Chan
Assistant Examiner — John Lindlof
(74) Attorney, Agent, or Firm — Dugan & Dugan, PC

(57) ABSTRACT

The invention includes receiving a first instruction in an in-order execution processing pipeline; starting execution of the first instruction; determining a first set of internal operation bits indicating a prospective value of control bits upon complete execution of the first instruction; determining whether the first instruction is a committed instruction; receiving a second instruction in the in-order execution processing pipeline before execution of the first instruction completes; determining a second set of internal operation bits based on: a) the first set of internal operation bits if the first instruction is a committed instruction; or b) a set of internal operation bits of a last committed instruction if the first instruction is not a committed instruction; and starting execution of the second instruction in the in-order execution processing pipeline before execution of the first instruction completes using the second internal operation bits. Numerous other aspects are provided.

4 Claims, 3 Drawing Sheets

PIPELINED PROCESSING

FIELD OF THE INVENTION

The present invention relates generally to processors, and more particularly to methods and apparatus for pipelined processing within a processor.

BACKGROUND

An instruction execution unit (e.g., a floating point unit) may employ an in-order processing pipeline for processing and completing (e.g., executing) instructions. The floating point unit may include a control/status register, which stores control bits that indicate how instructions are to be processed. The floating point unit may receive a first instruction that alters one or more of the control bits, thereby controlling execution of subsequent instructions. However, the value of the one or more altered control bits may not be known until the first instruction execution completes (e.g., when the first instruction reaches the end of the pipeline). Therefore, execution of a subsequent instruction, which requires the one or more altered control bits, may not be permitted to start until the first instruction execution completes. Consequently, the floating point unit may delay (e.g., by employing stalls or pipeline bubbles) the start of subsequent instruction execution until the first instruction execution completes. Such stalls are referred to as dependency stalls because execution of the subsequent instruction is delayed because the subsequent instruction depends on control bits to be updated (e.g., modified or altered) by a previous instruction. Dependency stalls may result in a large performance penalty for deep in-order execution processing pipelines (e.g., pipelines with a large number of stages).

To avoid delaying the start of an instruction, according to one solution, the control/status register described above is split into a control register and a status register, and register-renaming and out-of-order processing techniques are used for instruction processing. However, such a solution requires a large amount of hardware, and is therefore very complex.

Accordingly, methods and apparatus are desired for in-order execution pipelined processing.

SUMMARY OF THE INVENTION

In a first aspect of the invention, a first method is provided for pipelined processing. The first method includes the steps of receiving a first instruction in an in-order execution processing pipeline; starting execution of the first instruction in the in-order execution processing pipeline; determining a first set of internal operation bits indicating a prospective value of control bits upon complete execution of the first instruction; determining whether the first instruction is a committed instruction; receiving a second instruction in the in-order execution processing pipeline before execution of the first instruction completes; determining a second set of internal operation bits based on: a) the first set of internal operation bits if the first instruction is a committed instruction; or b) a set of internal operation bits of a last committed instruction if the first instruction is not a committed instruction; and starting execution of the second instruction in the in-order execution processing pipeline before execution of the first instruction completes using the second internal operation bits.

In a second aspect of the invention, a first apparatus is provided for pipelined processing. The first apparatus includes an in-order execution processing pipeline for executing instructions; first logic coupled to the in-order execution processing pipeline and adapted to: receive a first instruction that will modify a control bit upon execution; before execution of the first instruction completes, determine what the value of the control bit will be after the in-order execution processing pipeline completes executing the first instruction; and second logic coupled to the first logic and adapted to, before execution of the first instruction completes, store what the value of the control bit will be after the in-order execution processing pipeline completes the first instruction. Numerous other aspects are provided in accordance with these and other aspects of the invention.

Other features and aspects of the present invention will become more fully apparent from the following detailed description, the appended claims and the accompanying drawings.

DETAILED DESCRIPTION

The present invention provides methods and apparatus for efficient pipelined processing in a processor. More specifically, according to the present methods and apparatus, a processor may receive a first instruction for execution in an in-order execution pipeline. The first instruction may alter control bits (e.g., floating point control register bits (FPCR)) that indicate how instructions are to be processed in an in-order execution processing pipeline. As will be described below, such control bits are stored in a register. Before the first instruction execution completes (e.g., directly after receiving the first instruction), the processor receives a second instruction for execution in the in-order execution pipeline. The second instruction requires the altered control bits. Unlike conventional in-order processors, the present methods and apparatus do not require the start of the second instruction execution to be delayed (e.g., via a stall or bubble) until the first instruction execution completes. Therefore, the present methods and apparatus avoid a performance penalty of typical in-order execution pipelined processing. More specifically, the latency of the present methods and apparatus is not increased by stalls or bubbles (e.g., dependency stalls). Further, by performing in-order instruction execution, the present methods and apparatus avoid the complexities of the instruction processing techniques mentioned above, and therefore, may be implemented in a machine with a very short cycle time.

Figure 1:
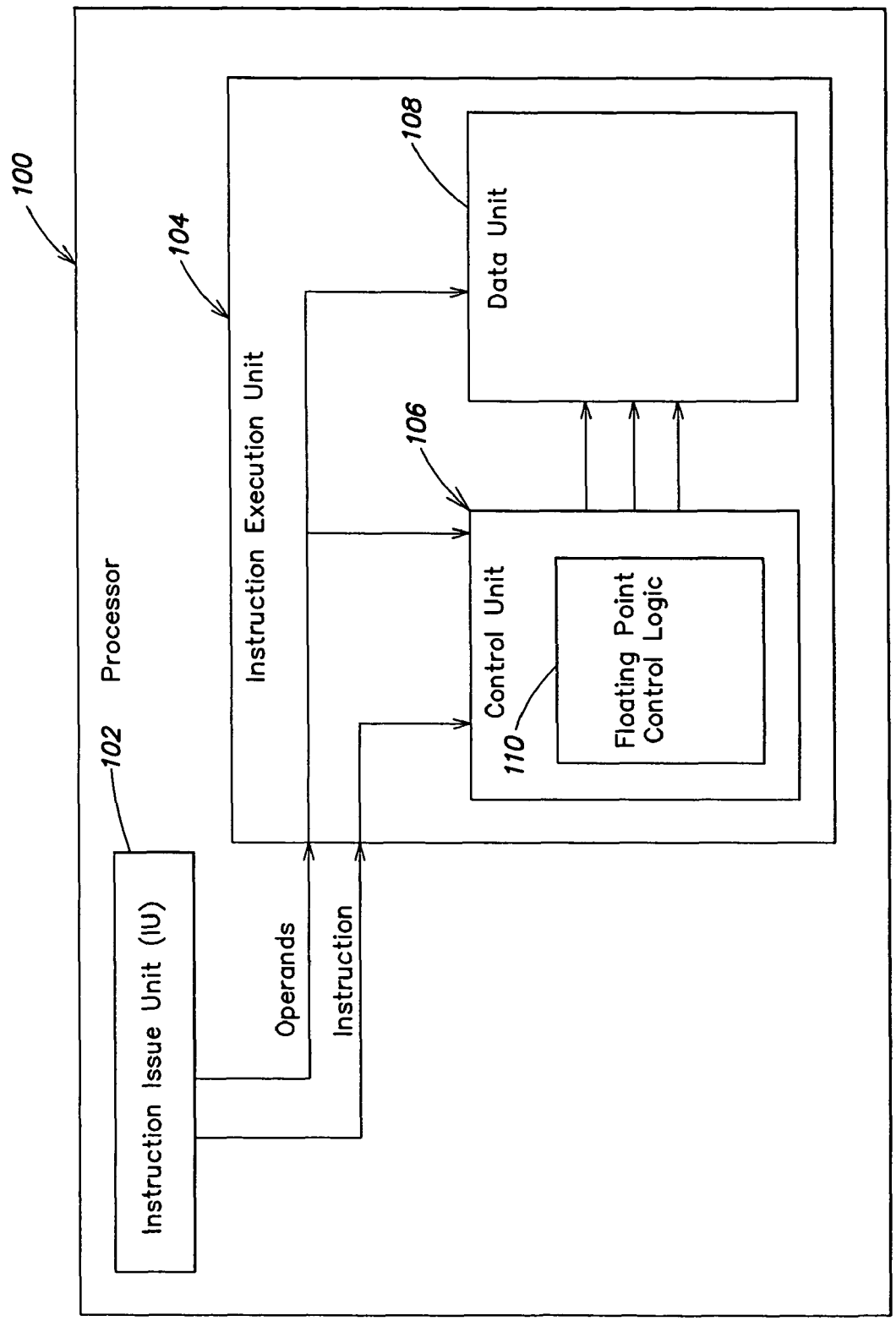
FIG. 1 is a block diagram of an apparatus for in-order execution pipelined processing in accordance with an embodiment of the present invention.

FIG. 1 is a block diagram of an apparatus for in-order execution pipelined processing in accordance with an embodiment of the present invention. With reference to FIG. 1, a processor 100 for executing instructions includes an Instruction Issue Unit (IU) 102 coupled to an Instruction Execution Unit 104. The IU 102 issues instructions and operands, among other things, to the Instruction Execution Unit 104. In one embodiment, the Instruction Execution Unit 104 is a Floating Point Execution Unit (FPU) for performing floating point operations, such as floating point arithmetic.

However, in other embodiments, the Instruction Execution Unit 104 may be an Integer Execution Unit, Load/Store Execution Unit, or the like.

The Instruction Execution Unit 104 includes a control unit 106 coupled to a data unit 108. The control unit 106 receives an instruction from the IU 102 and optionally one or more portions of the operands (e.g., corresponding to the instruction) and, the data unit 108 receives the operands from the IU 102. The control unit 106 may include control logic (e.g., floating point control logic 110), which defines a processing pipeline (e.g., an in-order execution processing pipeline) for efficient pipelined processing of instructions in accordance with the present methods. The floating point control logic 110 includes any suitable combination of logic, registers, memory or the like, and in at least one embodiment may comprise or be part of an application specific integrated circuit (ASIC). Details of exemplary floating point control logic 110 in accordance with an embodiment of the present invention are described below with reference to FIG. 3.

Figure 2:
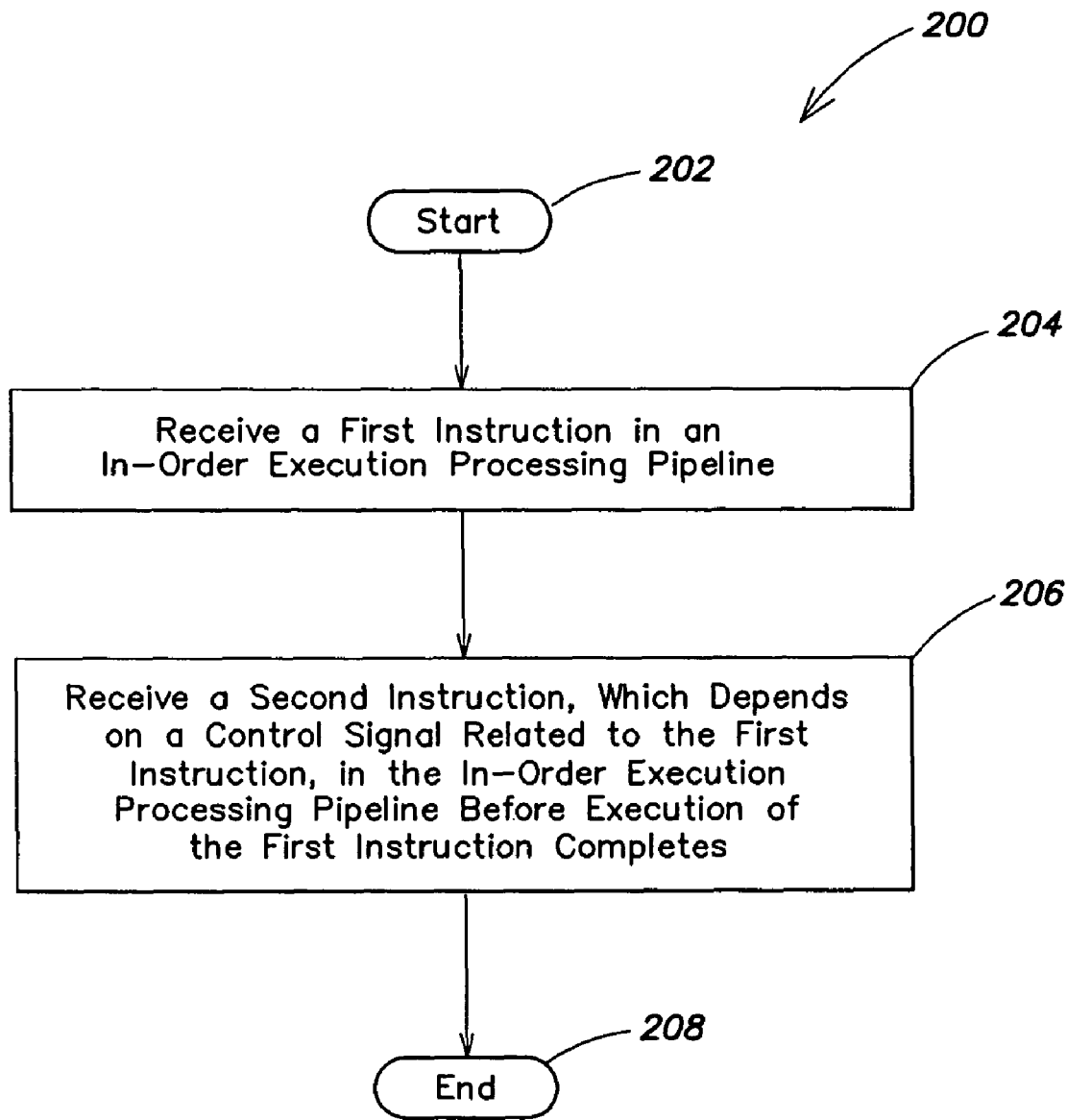
FIG. 2 illustrates a method for in-order execution pipelined processing in accordance with an embodiment of the present invention.

The operation of an apparatus for in-order execution pipelined processing is now described with reference to FIG. 1, and with reference to FIG. 2 which illustrates a method for in-order execution pipelined processing in accordance with an embodiment of the present invention. With reference to FIG. 2, in step 202, the method 200 begins. In step 204, a first instruction is received in an in-order execution processing pipeline. For example, the IU 102 issues the first instruction to the control unit 106 and issues operands (e.g., corresponding to the first instruction) to the data unit 108 of the Instruction Execution Unit 104. The floating point control logic 110 receives the first instruction. The first instruction may require control bits that indicate how the first instruction is executed. Therefore, prior to first instruction execution completion, the floating point control logic 110 associates a first set of bits (e.g., internal operation bits) which may be required for execution of the first instruction with the first instruction. For example, the first set of internal operation bits is associated with the first instruction during an initial stage of the in-order execution processing pipeline. The first set of internal operation bits are based on the value of the control bits as updated by the previous instruction in the in-order execution processing pipeline.

The in-order execution processing pipeline starts execution of the first instruction. The floating point control logic 110 may employ the first set of internal operation bits to execute the first instruction. The first instruction along with the first set of internal operation bits flows through a plurality of stages included in the in-order execution processing pipeline. Execution of the first instruction completes as the first instruction flows through a last stage of the in-order execution processing pipeline. Upon execution completion of the first instruction, the first instruction may update (e.g., modify or alter) one or more control bits that indicate how an instruction (e.g., a subsequent instruction) is to be processed. Such control bits may be stored in a register (e.g., a combined floating point status/control register (FPSCR)). For example, the Instruction Execution Unit 104 may receive an instruction on which other instructions depend, such as a move-to instruction, for execution. A move-to instruction may update (e.g., modify or alter) the control bits that indicate how an instruction is processed. Alternatively, the Instruction Execution Unit 104 may receive a non-move-to instruction, such as an arithmetic instruction, for execution. A non-move-to instruction does not modify the control bits.

Assuming the first instruction received by the Instruction Execution Unit 104 is a move-to instruction, the first instruction modifies the control bits upon instruction execution completion. Subsequent instructions may depend on the first instruction. More specifically, subsequent instructions may require the modified control bits before execution of such instructions may start. For example, a subsequent non-move-to instruction (e.g., non-move-to instruction received directly after the first instruction) may require the modified control bits to execute. In contrast to conventional in-order execution processing in which the receipt and/or execution of such a subsequent instruction is delayed until a previous command completes, in step 206 of the present invention, a second instruction (e.g., the subsequent non-move-to instruction) is received in the in-order execution processing pipeline before execution of the first instruction completes. For example, the IU 102 issues the second instruction to the control unit 106 and issues operands (e.g., corresponding to the second instruction) to the data unit 108 of the Instruction Execution Unit 104. The floating point control logic 110 receives the second instruction. The second instruction may require control bits that indicate how the second instruction is executed. Therefore, prior to second instruction execution completion, the floating point control logic 110 associates a second set of bits (e.g., internal operation bits) with the second instruction. The second set of internal operation bits serves as the control bits which are required by the second instruction for execution. The second set of internal operation bits is associated with the second instruction, for example, during an initial stage of the in-order execution processing pipeline. The second set of internal operation bits is based, in part, on the value of the first set of internal operation bits. The second instruction along with the second set of internal operation bits flows through the in-order execution processing pipeline.

The in-order execution processing pipeline starts execution of the second instruction before execution of the first instruction completes. The floating point control logic 110 may employ the second set of internal operation bits to execute the second instruction. More specifically, because bits (e.g., the second set of internal operation bits) which indicate how the second instruction should execute are associated with the second instruction, for example, during an initial in-order execution processing pipeline stage, the floating point control logic 110 does not have to delay (e.g., via stalls or bubbles) the start of execution of the second instruction until the first instruction execution completes and the first instruction updates the control bits. Similar to the first instruction execution, upon execution completion, the second instruction may update (e.g., modify) one or more control bits of that indicate how instructions (e.g., subsequent instructions) are processed.

Thereafter, step 208 is performed. In step 208, the method 200 ends. Through the use of the method 200 of FIG. 2, dependency stalls during in-order execution pipelined processing is reduced and/or eliminated.

Figure 3:
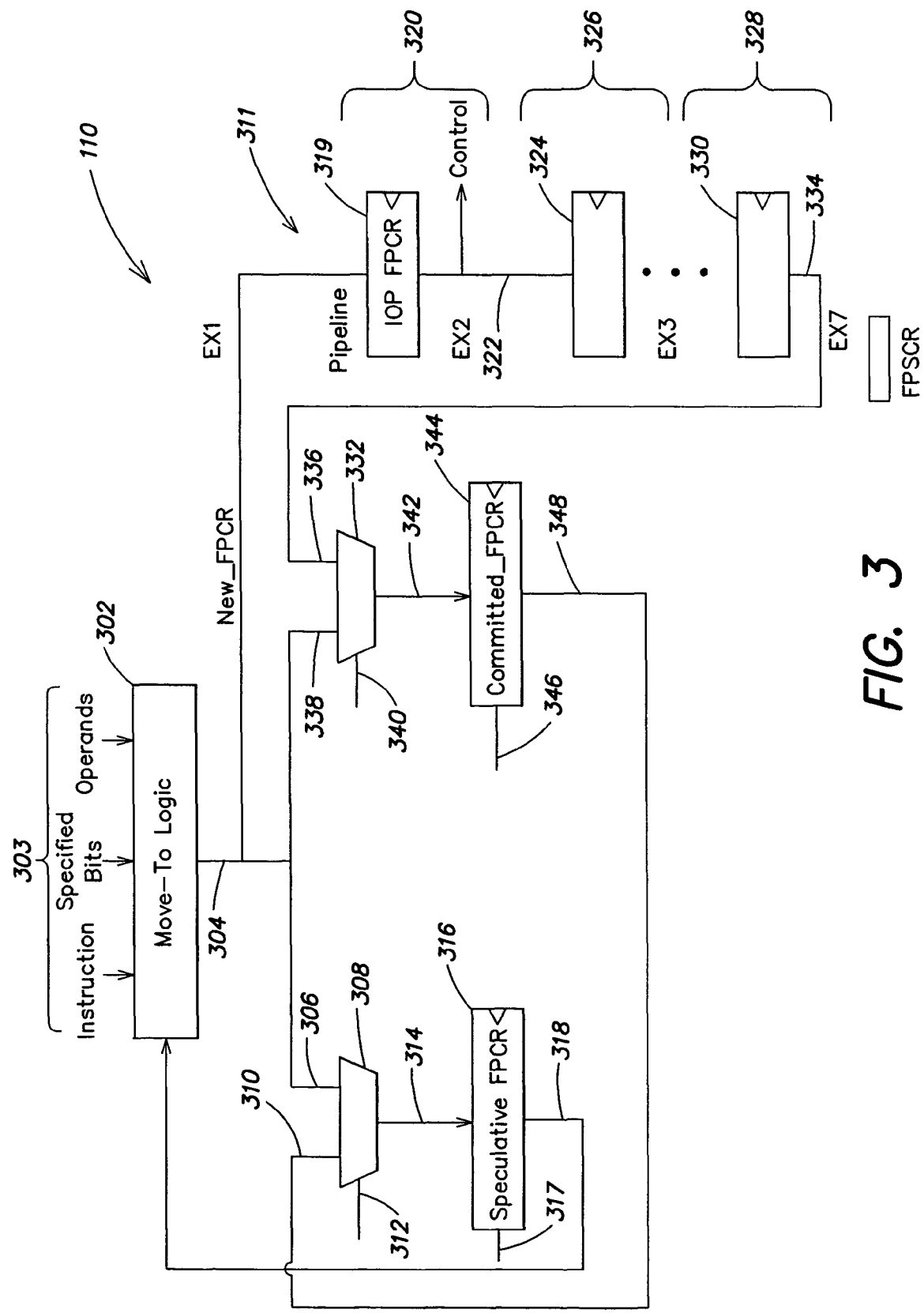
FIG. 3 is a block diagram of exemplary floating point control logic included in the apparatus for in-order execution pipelined processing in accordance with an embodiment of the present invention.

FIG. 3 is a block diagram of exemplary floating point control logic included in the apparatus for in-order execution pipelined processing in accordance with an embodiment of the present invention. With reference to FIG. 3, the floating point control logic 110 includes move-to logic 302. The move-to logic 302 receives as input (e.g., via inputs 303) from the IU 102 an instruction to be executed, an indication of which control bits the instruction is to alter (e.g., specified bits), and optionally one or more portions of operands. Upon instruction execution completion, an instruction may alter control bits, which are stored in a combined floating point control/status register (FPSCR). The FPSCR stores control bits for rounding-mode control, IEEE exception control, etc., and status bits for overflow, underflow, operation result status, etc. Software code executing in the processor 100 may access the FPSCR frequently. The move-to logic 302 also receives (e.g., uses) a speculative FPCR signal as input. The speculative FPCR signal is a set of bits that indicates what value the control bits, which may be required by an instruction, will be once a preceding instruction completes executing. Based on these inputs, the move-to logic 302 determines what the value of the control bits will be after the received instruction completes executing and outputs such value as a New_FPCR signal via a move-to logic output 304.

The output 304 of the move-to logic 302 is coupled to a first data input 306 of a first multiplexer 308. Therefore, the first multiplexer 308 receives New_FPCR as a first data input signal. The first multiplexer 308 receives a Committed_FPCR signal as a second data input signal via a second data input 310. Committed_FPCR is a set of bits associated with an instruction, which has reached a predefined stage (e.g., a commit stage) in an in-order execution processing pipeline 311. Once an instruction reaches the commit stage of the in-order execution processing pipeline, the instruction cannot be flushed or removed from the in-order execution processing pipeline (e.g., the instruction is committed), and therefore, will be completed by the in-order execution processing pipeline and the results of the instruction are committed to the architectural machine state (e.g., the FPSCR). A flush command cancels all instructions that are in stages before the commit stage. Consequently, when instructions are flushed or removed from the in-order execution processing pipeline by the processor 100, Committed_FPCR indicates the value of the control bits as updated by the last committed instruction in the in-order execution processing pipeline. In the embodiment shown, the in-order execution processing pipeline includes ten stages (only seven shown) and stage 7 (EX 7) is the commit stage. In other embodiments, the in-order execution processing pipeline may include a larger or smaller number of stages and/or the commit stage may be an earlier or later stage of the in-order execution processing pipeline. In one or more embodiments, an instruction in the first stage (EX 1) of the in-order execution processing pipeline 311 may be a move-to instruction, which is committed (e.g., cannot be flushed from the in-order execution pipeline), and therefore, will be completed regardless of a flush command being received.

The first multiplexer 308 includes a third input (e.g., selection input) 312 on which the first multiplexer 308 receives a Revert signal. The Revert signal serves as a select signal for the first multiplexer 308. The multiplexer 308 selectively outputs one of the data input signals based on the select signal via a multiplexer output 314. Revert=ex1_flush AND NOT ex1_is_committed_move_to_iop, where ex1_flush=1 when the pipeline is to be flushed and ex1_is_committed_move_to_iop=1 when the instruction (IOP) in the first stage (EX 1) is an already committed move-to instruction. When Revert is asserted (e.g., is a logic "1"), the first multiplexer 308 selectively outputs Committed_FPCR. Otherwise, the first multiplexer 308 selectively outputs New_FPCR.

The first multiplexer 308 is coupled to a first register 316 via the multiplexer output 314. The first register 316 writes the signal output from the first multiplexer 308 when a write-enable signal, which is input via a write-enable input 317 of the first register 316, is asserted. More specifically, when a Speculative_WE signal is asserted, the first register 316 writes and stores the signal output from the first multiplexer 308 in the first register 316 as Speculative FPCR. Speculative_WE=ex1_move_to_iop OR ex1_flush, where ex1_move_to_iop=1 when the instruction (IOP) in the first stage (EX 1) is a move-to instruction. In this manner, the first register 316 serves as a speculative "shadow" register that stores bits (e.g., Speculative FPCR) which represent what the value of control bits will be after an instruction completes (e.g., a previous instruction). Therefore, Speculative FPCR serves as a shadow copy of the control bits that will be stored in the FPSCR. An output 318 of the first register 316 is coupled to an input of move-to logic 302 and serves as the Speculative FPCR signal. In this manner, the floating point control logic 110 may provide a set of bits (e.g., Speculative FPCR), which represents what the value of the control bits will be once execution of a previous instruction is completed, to the instruction received by the move-to logic 302. Consequently, the processor 100 may start execution of an instruction received by the move-to logic 302 before execution of the previous instruction completes.

The floating point control logic 110 associates New_FPCR output by the move-to logic 302 with the instruction received by the move-to logic 302, for example, during an initial stage EX 1 of the in-order execution processing pipeline. New_FPCR serves as internal operation bits (e.g., IOP FPCR) for the instruction. As stated, New_FPCR is based on Speculative FPCR and the instruction received by the move-to logic 302. During the initial stage EX 1 of the in-order execution processing pipeline, the floating point control logic 110 employs bits representing what the value of the control bits will be once a previous instruction execution completes (e.g., Speculative FPCR) as the control bits for the instruction received by the move-to logic 302. However, during subsequent stages of the in-order execution processing pipeline, the internal operation bits (e.g., IOP FPCR) associated with the instruction may be employed (e.g., as control bits) to execute the instruction. The output of the move-to logic 302 is coupled to a first pipeline register 319 which stores the instruction and associated internal operation bits. The first pipeline register 319 is included in a second stage 320 of the in-order execution processing pipeline 311.

An output 322 of the first pipeline register 319 is input by a second pipeline register 324. During a subsequent time period (e.g., processor cycle), the instruction and associated internal operation bits are stored in the second pipeline register 324. The second pipeline register 324 is included in a third stage 326 of the in-order execution processing pipeline 311. In this manner, the instruction flows or moves from the second stage 320 to the third stage 326 of the in-order execution processing pipeline 311. The instruction similarly flows through the remaining stages of the in-order execution processing pipeline 311. In this manner, each pipeline stage may include an instruction and control bits corresponding to the instruction.

As stated, the seventh stage 328 of the in-order execution processing pipeline 311 is the commit stage. A sixth pipeline register 330 included in the seventh stage 328 is coupled to a second multiplexer 332 (in addition to being coupled to an eighth stage (not shown) of the in-order execution processing pipeline 311). More specifically, an output 334 of the sixth pipeline register 330 is coupled to a first data input 336 of the second multiplexer 332. The internal operation bits associated with the instruction are output from the sixth pipeline register 330 and input by the second multiplexer 332 via the first data input 336. The output 304 of the move-to logic 302 is coupled to a second data input 338 of the second multiplexer 332. Therefore, New_FPCR output from the move-to logic 302 is input by the second multiplexer 332 via the second data input 338. A signal (e.g., ex1_committed), which may be asserted on a third input (e.g., selection input) 340 of the second multiplexer 332, serves as a select signal. The second multiplexer 332 selectively outputs (e.g., via a second multiplexer output 342) one of the data inputs based on the select signal. When ex1_committed=1, the second multiplexer 332 selects the New_FPCR. Ex1_committed=ex1_is_committed_move_to_iop, where, as stated, ex1_is_committed_move_to_iop=1 when the instruction in stage EX 1 is already a committed move-to instruction. Such an instruction is committed even though the instruction has not passed the commit stage. Otherwise, the second multiplexer 332 selects the internal operation bits associated with a previous instruction which reached the commit stage of the in-order execution processing pipeline 311.

The second multiplexer 332 is coupled to a second register 344 via the second multiplexer output 342. The second register 344 writes the signal output from the second multiplexer 342 when a write-enable signal is asserted on a write-enable input 346 of the second register 344. More specifically, when a Committed_WE signal is asserted on the write enable input 346, the second register 344 writes and stores the signal output from the second multiplexer 332. Committed_WE=ex7_move_to_iop OR ex1_is_committed_move_to_iop, where ex7_move_to_iop=1 when the instruction in stage EX 7 is a move-to instruction. In this manner, the second register 344 serves as a committed "shadow" register that stores bits (e.g., Committed_FPCR) which represent what the value of control bits will be after a previous (e.g., the last) committed instruction execution completes. Therefore, Committed_FPCR serves as a shadow copy of control bits that will be stored in the FPSCR. More specifically, the floating point control logic 110 may determine an instruction cannot be flushed from the in-order execution processing pipeline (e.g., is committed) and store internal operation bits associated with such instruction as committed control bits. An output 348 of the second register 344 may be coupled and/or provided to the first input 310 of the first multiplexer 308. Therefore, the second register 344 provides Committed_FPCR to the first multiplexer 308 as data input. As stated above, the first multiplexer 308 selectively outputs Committed_FPCR when Revert is asserted.

In this manner, the floating point control logic 110 may start execution of an instruction (e.g., a second instruction) before the in-order execution processing pipeline completes execution of a previous instruction (e.g., a first instruction). Further, the floating point control logic 110 may determine the previous instruction is committed and store bits representing what the control bits will be after the committed instruction completes execution, thereby enabling the floating point control logic 110 to process (e.g., resume processing) instructions after the processor 100 flushes the in-order execution processing pipeline. For example, the processor 100 stores internal operation bits associated with the first instruction in the second register 344, and may flush the second instruction (which was received after the first instruction) from the in-order execution processing pipeline 311. After flushing the second instruction, the floating point control logic 110 may receive a third instruction and start executing the third instruction. Prior to third instruction execution completion, the move-to logic 302 associates New_FPCR with the third instruction. The New_FPCR is based on the Speculative FPCR, which in this case is reverted to Committed_FPCR (e.g., the value of the IOP FPCR after completion of the first instruction) after the flush. The New_FPCR may also be based on the third instruction.

In one or more embodiments, the exemplary floating point control logic 110 can not have an instruction in a stage before the commit stage (e.g., in an initial stage) of the in-order execution processing pipeline which is already committed. In such embodiments, the floating point control logic 110 does not include the second multiplexer 332. Further, the output 334 of the pipeline register included in the commit stage (e.g., the sixth pipeline register 330) is coupled to an input of the second register 344. In this manner, the second register 344 stores bits representing what the value of control bits will be after a committed instruction execution completes, thereby enabling the floating point control logic 110 to resume processing instructions after the processor 100 flushes the in-order execution processing pipeline 311.

Alternatively, in one or more embodiments, the floating point control logic 110 is only issued committed instructions and does not need to store bits associated with a speculative instruction. Therefore, in such embodiments, the processor may not flush the in-order execution processing pipeline. In such embodiments, the floating point control logic does not include the second multiplexer 332, the second register 344 and the first multiplexer 308. Further, the output 304 of the move-to logic 302 may be coupled directly to an input of the first register 316.

The foregoing description discloses only exemplary embodiments of the invention. Modifications of the above disclosed apparatus and methods which fall within the scope of the invention will be readily apparent to those of ordinary skill in the art. For instance, the Speculative FPCR and Committed_FPCR may be replicated in a multithreaded machine. Although the present methods and apparatus were described above with reference to a floating point unit, the present method may be employed by other types of instruction execution units. Further, the present methods and apparatus may be employed for any register which controls instruction execution and which includes values that may be altered in the execution pipeline.

Accordingly, while the present invention has been disclosed in connection with exemplary embodiments thereof, it should be understood that other embodiments may fall within the spirit and scope of the invention, as defined by the following claims.

The invention claimed is:

1. An apparatus for pipelined processing, comprising:
an in-order execution processing pipeline for executing instructions;
first logic coupled to the in-order execution processing pipeline and adapted to:
receive a first instruction that will modify a control bit upon execution;
before execution of the first instruction completes, determine what the value of the control bit will be after the in-order execution processing pipeline completes executing the first instruction; and
second logic coupled to the first logic and adapted to, before execution of the first instruction completes, store what the value of the control bit will be after the in-order execution processing pipeline completes the first instruction.

2. The apparatus of claim 1 further comprising third logic coupled to the first logic and the in-order execution processing pipeline and adapted to, if the first instruction reaches a pre-defined stage of the in-order execution processing pipeline, store, before execution of the first instruction completes, what the value of the control bit will be after the in-order execution processing pipeline completes executing the first instruction;
wherein once the first instruction reaches the pre-defined stage of the in-order execution processing pipeline, the first instruction cannot be removed from the in-order execution processing pipeline.

3. The apparatus of claim 1 wherein the in-order execution processing pipeline is adapted to receive a second instruction before execution of the first instruction completes, wherein the second instruction depends on the modified control bit.

4. A method of pipelined processing comprising:

receiving a first instruction in an in-order execution processing pipeline;

starting execution of the first instruction in the in-order execution processing pipeline;

determining a first set of internal operation bits indicating a prospective value of control bits upon complete execution of the first instruction;

determining whether the first instruction is a committed instruction;

receiving a second instruction in the in-order execution processing pipeline before execution of the first instruction completes;

determining a second set of internal operation bits based on:
  a) the first set of internal operation bits if the first instruction is a committed instruction; or
  b) a set of internal operation bits of a last committed instruction if the first instruction is not a committed instruction; and starting execution of the second instruction in the in-order execution processing pipeline before execution of the first instruction completes using the second internal operation bits.

* * * * *